US006710986B1

(12) United States Patent
Sato et al.

(10) Patent No.: US 6,710,986 B1
(45) Date of Patent: Mar. 23, 2004

(54) TUNNELING MAGNETORESISTIVE HEAD AND A PROCESS OF TUNNELING MAGNETORESISTIVE HEAD

(75) Inventors: Toshihiko Sato, Kawaguchi (JP); Shinji Yuasa, Tsukuba (JP)

(73) Assignees: Hitachi, Ltd., Tokyo (JP); Agency of Industrial Science and Technology, Tokyo (JP)

( * ) Notice: Subject to any disclaimer, the term of this patent is extended or adjusted under 35 U.S.C. 154(b) by 183 days.

(21) Appl. No.: 09/666,608

(22) Filed: Sep. 20, 2000

(30) Foreign Application Priority Data

Sep. 24, 1999 (JP) .............................. 11-271282

(51) Int. Cl.$^7$ ................................ G11B 5/33
(52) U.S. Cl. .................. 360/324.2; 428/611; 428/621; 428/629; 428/632; 428/637; 428/668; 428/682; 428/212; 428/409; 428/692
(58) Field of Search .................. 360/324.2; 428/611, 428/621, 629, 632, 637, 668, 682, 212, 409, 692

(56) References Cited

U.S. PATENT DOCUMENTS

| | | | | |
|---|---|---|---|---|
| 5,793,697 A | * | 8/1998 | Scheuerlein | 365/230.07 |
| 5,801,984 A | * | 9/1998 | Parkin | 365/158 |
| 5,942,309 A | * | 8/1999 | Kamijo | 428/141 |
| 6,452,204 B1 | * | 9/2002 | Ishiwata et al. | 257/9 |

OTHER PUBLICATIONS

Ferromagnetic–Insulator–Ferromagnetic Tunneling: Spin–dependent tunneling and Large Magnetoresistance in Trilayer Junctions(invited) by Jagadeesh S. Moodera, Et Al. 1996 American Institute of Physics pp. 4724–4729.

Conductance and Exchange Coupling of Two Ferromagnets Separated by a Tunneling Barrier by J.C. Slonczewski vol. 39, No. 10 pp. 6995–7002.

Principles of Electron Tunneling Spectroscopy by E.L. Wolf, Oxford University Press 1989.

Three–Dimensional Momentum Density of Magnetic Electrons in Ferromagnetic Iron by Yoshikazu Tanaka, Et Al. 1993 The American Physical Society, vol. 70, No. 10 pp. 1537–1540.

Magnetic Tunnel Junctions with in Situ Naturally–Oxidized Tunnel Barrier by H. Tsuge, Et Al. 1997 American Institute of Physics pp. 3296–3298.

* cited by examiner

*Primary Examiner*—Paul Thibodeau
*Assistant Examiner*—Kevin M. Bernatz
(74) *Attorney, Agent, or Firm*—Antonelli, Terry, Stout & Kraus, LLP

(57) ABSTRACT

There is proposed a high-sensitive TMR element wherein the selection of electronic state contributing to tunnel conduction is optimized. In this invention, a junction plane between a ferromagnetic layer (210) having a bcc structure and a tunnel barrier layer (310) is constituted by (211) plane or (110) plane of the ferromagnetic layer (210). The tunnel barrier layer (310) is formed of a thin aluminum oxide film which is formed through two stages, i.e. a first stage wherein an aluminum film having a thickness of 1 nm or less is formed on the surface of a magnetic metal by taking advantage of the excellent wettability of aluminum to the surface of metallic film, the resultant aluminum film being subsequently naturally oxidized or oxidized by oxygen radical; and a second stage wherein an aluminum thin film is formed directly from an aluminum flux in an oxygen atmosphere or an atmosphere of oxygen radical.

17 Claims, 14 Drawing Sheets

WORD-LINE: 420
X-READ-LINE: 421
416

421
116
311
216
251
255
417
420
416
516

TUNNELING MAGNETORESISTIVE HEAD AND A PROCESS OF TUNNELING MAGNETORESISTIVE HEAD

BACKGROUND OF THE INVENTION

The present invention relates to a tunneling magnetoresistive element, and also to a magnetic head and memory device utilizing the tunneling magnetoresistive element. The present invention relates also to a method of manufacturing these devices.

As an example of the magnetic sensor based on: tunneling magnetoresistance effect (TMR), a TMR element is proposed by S. Jagadeesh Moodera and Lisa R. Kinder (J. Appli. Phys. Vol.79 (1996), No. 8, pp.4724) (Publication 1); and by J. C. Slonczewski (Physical Review B Vol.39 (1989), No. 10, pp.6995) (Publication 2). Since this TMR element is capable of exhibiting a large magnetoresistance effect as compared with the conventional magnetoresistive element (MR element), the application thereof as a read magnetic head is highly expected.

This TMR element is constructed as shown in FIG. 1 such that a tunnel barrier layer 300 is sandwiched between a first magnetic layer 200 and a second magnetic layer 100. In this case, the first magnetic layer 200 is formed on the surface of a lead wire layer 400 formed on a substrate 500 and is connected with an external electric circuit. On the other hand, the second magnetic layer 100 is also connected with the external electric circuit. If, in the case, these two kinds of magnetic layers 100 and 200 differ in coercivity from each other, there will be generated a phenomenon that, the orientation of the magnetization of these magnetic layers 100 and 200 becomes parallel or anti-parallel with each other corresponding to the changes in external magnetic field 800.

Meanwhile, when a bias voltage V is applied between these two kinds of magnetic layers 100 and 200, a tunnel current I is allowed to flow therebetween through the tunnel barrier layer 300 with the tunnel resistance R in this case being defined by R=V/I. It will be recognized through the observation of the magnitude of the tunnel resistance R whether the orientation of the magnetization of the two magnetic layers 100 and 200 is parallel or anti-parallel. A device which is capable of outputting the changes of tunnel resistance R of a TMR element corresponding to the change of the external magnetic field 800 is the aforementioned magnetic sensor based on tunneling magnetoresistance effect.

As disclosed in the aforementioned publication No. 1, the magnitude of changes of tunnel resistance R is mainly determined by the value of the polarizability P1 of a magneticllayer 100 and also by the value of the polarizability P2 of a magnetic layer 200. The value of "polarizability" is closely related to the magnitude of magnetization (=spin polarizability) of a substance, and the magnitude of magnetization is a value which is specific to a substance. As the magnitude of "polarizability" becomes closer to 1, the magnitude of changes of tunnel resistance R would become larger.

For each magnetic layer, the value of "polariziability" can be determined by finding the number of electronic state which is capable of contributing to the tunnel conduction. Namely, the "polarizability" inside each magnetic layer is determined by a difference between the number of spin-up state and the number of spin-down state, both of which are capable of contributing to the tunnel conduction. A difference in number between the number of spin-up state and the number of spin-down state also becomes an issue on the occasion of determining the magnetization of a metallic magnetic body. The numbers of electronic state to be employed for defining the value of "polarizability" here differs from that to be employed for determining the ordinary magnetization in the respect that only the electronic states which are capable of contributing to the tunnel conduction is taken up out of the possible electronic states inside the magnetic layers. In other words, when only the electron which is capable of contributing to the tunnel conduction is taken into consideration, the value of "polarizability" discussed herein is not necessarily identical with the value of ordinary magnetization.

An object of the present invention is to provide a tunneling magnetoresistive element which is capable of obtaining a higher "polarizability" and hence capable of achieving a larger magnitude of changes in tunnel resistance R, which can be realized by optimizing the selection of electronic states that can contribute to the tunnel conduction even though a magnetic material having the same magnetization is employed.

Another object of the present invention is to provide a high sensitivity magnetic head and the method of manufacturing such a magnetic head.

A further object of the present invention is to provide a magnetic memory which is non-volatile and is capable of reading and writing data at a high speed, and the method of manufacturing such a magnetic memory.

SUMMARY OF THE INVENTION

First of all, the meaning of the state called "an electronic state that can contribute to the tunnel conduction" will be explained. This electronic state may be summarized in such a way that it is (1) an electronic state in the vicinity of Fermi surface and at the same time, (2) an electronic state having a wavevector which is perpendicular to tunnel junction plane (i.e. parallel with the direction of thickness of tunnel barrier). When these electronic states of the magnetic material are located in the wavevector space, the aforementioned electronic states that can contribute to the tunnel conduction are specified by the wavevectors which are roughly normal to the tunnel junction plane and which have the lengths that roughly correspond to the length of the Fermi energy of the direction.

The aforementioned requirement (2) are brought about by the wavevector selectivity of the tunnel barrier. As reported by E. Wolf, in "Principles of Electron Tunneling Spectroscopy" Oxford University Press, Oxford, 1989, pp. 23 (Publication 3), in the case of ideal dielectric tunnel barrier which is constituted by infinite planes and where alumina, etc. is employed, the transmission factor of tunneling electron becomes maximum when the wavevector of tunneling electron that can be described by a plane wave is parallel with the normal line of tunnel barrier. However, when the wavevector begins to include a component perpendicular to the normal line of the tunnel barrier, the transmission factor of tunneling electron will be sharply decreased. When it is assumed that the barrier height is 2 eV, the thickness of tunnel barrier is 1 nm, and Fermi level is 5 eV, the angle between the direction of normal line and the wavevector as the transmission factor of tunneling electron falls down to 1/e (e: the base of natural logarithm) would become only around 8 degrees. Namely, the wavevector of the tunneled electron is very well aligned. It may be said in view of this fact that the tunnel barrier where the flatness thereof is sufficiently ensured is a device exhibiting a highlyefficient wavevector selectivity. In other words, the electronic state of the electron that has been taken up by the tunneling from the magnetic layer can be said to be only the electronic states included in a region of a very small solid angle which spreads around the gamma ($\Gamma$) point in the wavevector space.

Therefore, it is very likely that the tunneling electron to be obtained from a group of electronic states where the direction of wavevector is very sharply aligned is characteristically very sensitive to the anisotropy of the Fermi surface, i.e. the crystal anisotropy.

Such a characteristic of the tunneling electron can be inferred also from the experiment of magnetic Compto scattering where circular polarized X-ray is employed as set forth by Yoshidazu Tanaka, Nobuhiko Sakai, Yasunori Kubo and Hiroshi Kawata in "Physical Review Letters", Vol. 70, No.10, 1993, pp.1537–1540 (Publication 4). In this experiment, the polarizability of electron taken up from the surface of iron by means of circular polarized X-ray is directly measured, obtaining the result that the polarizability of electron to be released in the $\Gamma$-N direction is larger than the value of polarizability of electron to be released in the $\Gamma$-H direction.

As explained above, the present invention makes use of the fact that the polarizability of magnetic crystal exhibits a prominent anisotropy. Namely, by taking advantage of the wavevector selectivity of the tunnel barrier, the orientation of crystal face which exhibits a larger variation of tunnel magnetoresistance was investigated by the present inventors. As a result, it was found that the orientation exhibiting a large polarizability was (211) plane (crystal face, the same hereinafter) and (110) plane in the cases of iron and iron alloys.

FIG. 2 is a cross-sectional view schematically illustrating one example of the structure of a TMR device according to the present invention which enables to increase the magnitude of changes of tunneling magnetoresistance. As shown in FIG. 2, the TMR device is constituted by a first magnetic layer 210, a tunnel barrier layer 310 and a second magnetic layer 110. The first magnetic layer 210 is formed on the surface of a buffer layer 250 comprising at least one layer and is constituted by a thin crystal film which has been grown according to a specific crystal orientation that is determined by the kind and crystal orientation of the material of the buffer layer 250. Therefore, the specific crystal face of the first magnetic layer 210 appears at a junction plane between the tunnel barrier layer 310 and the first magnetic layer 210.

In this case, due to the wavevector selectivity of the tunnel barrier, only the electron exhibiting an electronic state having a wavevector which is perpendicular to the aforementioned junction plane is allowed to selectively tunnel from the first magnetic layer 210 to the second magnetic layer 110. This electronic state concurrently constitutes an electronic state having a wavevector which is perpendicular to the crystal face appearing on the junction plane of the first magnetic layer 210. Namely, by determining which crystal face should be selected for the junction plane of the first magnetic layer 210, only the electron of the electronic state of a specific kind will be selected among the electronic states represented by the wavevector within the wavevector space of a crystal material constituting the first magnetic layer 210.

The aforementioned crystal orientation differs depending on the material constituting the first magnetic layer 210; Any magnetic material can be employed as the first magnetic layer 210 provided that the orientation for optimizing the polarizability of a magnetic material is known and that the growth direction of the material can be so chosen to realize the optimum. The iron is only a pure ferromagnetic material exhibiting a bcc structure. On the other hand, iron alloys such as an iron-cobalt alloy, an iron-nickel alloy, an iron-chromium alloy, an ironrhodium alloy, an iron-platinum alloy, an iron-palladium alloy, an iron-iridium alloy and an iron-vanadium alloy also have the bcc structure and are ferromagnetic. Therefore, these materials are useful in the present invention.

In the process of accomplishing the present invention, various kinds of TMR elements were manufactured, each using the magnetic layer 210 having a different crystal orientation by making use of the aforementioned magnetic materials and then, changes of tunnel magnetoresistance were observed to search the orientation which is capable of optimizing the polarizability. As a result, it was found that the TMR element where (211) plane was employed was capable of exhibiting the largest changes in tunnel magnetoresistance. It was found that the TMR element which was capable of exhibiting next largest changes in tunnel magnetoresistance was one where (110) plane was employed. The magnitude of the changes in the latter TMR element was about 80% of the former TMR element where (211) plane was employed. In the cases of the TMR elements where other crystal faces were employed, the magnitude of the changes was not higher than 25% of the TMR element where (211) plane was employed. It was found from these results that most effective crystal orientation was (211) plane, and that, the (110) plane was also effective though it was inferior more or less as compared with the (211) plane.

The crystal orientation of the buffer layer 250 is determined depending on the crystal orientation of a lead wire layer 410 disposed underneath the buffer layer 250, and the crystal orientation of the lead wire layer 410 is determined depending on the kind of material and crystal orientation of a substrate 510 disposed underneath the lead wire layer 410. In other words, the factor which controls the crystal orientation of the magnetic layer 210 is the combination of the kinds and crystal orientations of the buffer layer 250, the lead wire layer 410 and the substrate 510.

By the way, in order to enable the tunnel barrier 310 to become a powerful wavevector selector, the junction plane between the magnetic layer 210 and the magnetic layer 110 is required to have a very high degree of flatness. For the purpose of obtaining this high degree of flatness, the tunnel barrier layer 310 of the present invention was formed by way of a method called "two-stage oxidation method".

As shown in the prior art such as the aforementioned Publication 1 and Applied Physics Letters, Vol. 71, No.22, 1997, pp.3296–3298 (Publication 5); H. Tsuge and T. Mitsuzuka, an aluminum oxide film has been employed for manufacturing a tunnel barrier of relatively high reliability. In the present invention also, an aluminum oxide film is employed for manufacturing a tunnel barrier. However, the method of forming a tunnel barrier according to the present invention, differs from the conventional method. Aluminum is known to be excellent in wettability to the surface of main magnetic metals such as iron, cobalt, nickel and alloys thereof. FIGS. 3 to 6 illustrate examples of manner of forming an aluminum oxide film (alumina) on the surface of the (001) plane of magnetic layer 211 wherein iron (Fe) was employed for constituting the magnetic layer 211. For convenience sake, the same components are referred to by the same reference numerals in these FIGS. 3 to 6.

FIG. 3A shows a state obtained when an aluminum thin film 320 was formed so that a thickness of the film was 1nm or less by way of vapor deposition on the magnetic layer 211 ((001) plane of iron) by making use of an ultra-high vacuum device. When the thickness of aluminum is sufficiently thin (1 nm or less), aluminum is enabled to densely cover the (001) Fe plane owing to a high wettability of aluminum, and at the same time, an aluminum thin film 320 having the (001) plane is allowed to grow reflecting the crystal face of the Fe. This fact was confirmed by the observation of RHEED (Reflective High Energy Electron Diffraction) pattern, and at the same time, the formation of an extremely flat interface between the aluminum thin film 320 and the Fe (001) plane was also confirmed. Subsequently, when oxygen gas was introduced into the ultra-high vacuum device, the aforementioned RHEED pattern was turned into a pattern indicating the formation of amorphous layer. This implied that, as shown in FIG. 3B, an aluminum oxide layer 330 having a very high flatness was formed, thus indicating an excellent interface formed between the tunnel barrier layer and the (001) Fe plane. By the way, upon the oxidation of aluminum, the original aluminum layer with a thickness of 1 nm was transformed into the aluminum oxide layer 330 with a thickness of 1.3 nm.

On the other hand, as shown in FIG. 4A, when aluminum is deposited to an increased thickness (more than 1 nm), not only the (100) plane of aluminum, but also (111) plane thereof was caused to generate (or a phenomenon of so-called facetting), thereby generating a slightly projected and recessed pattern on the surface of the aluminum layer 321. This fact was confirmed by a change of RHEED pattern. Even if oxygen gas was introduced into the ultra-high vacuum device, the aforementioned RHEED pattern was not turned into a pattern indicating the formation of complete amorphous state, thereby leaving the projected and recessed pattern as it was. As a result, a structure wherein the residual aluminum portions were enveloped was formed as shown in FIG. 4B, thus producing an aluminum oxide layer 331 having a projected and recessed surface. Under this condition, not only the wavevector of (001) orientation, but also the wavevector of (111) orientation may possibly be allowed to tunnel, thereby weakening the selectivity of wavevector. Therefore, it is difficult to manufacture a tunnel barrier having a thickness of 1.3 nm or more and yet exhibiting a sufficient flatness if the manufacture of the tunnel barrier is to be performed by simply oxidizing an aluminum film.

The demand to form a tunnel barrier having a thickness of 1.3 nm or more cannot be disregarded from the viewpoint of controlling the characteristics of TMR element. Under the circumstances, a method shown in FIG. 5 was tried. FIGS. 5A and 5B show a process wherein an aluminum oxide layer 330 having a thickness of 1.3 nm or less was formed by a method shown in FIG. 3. Then, the ultra-high vacuum device was exhausted again so as to purge the oxygen that had been introduced into the vacuum device for the purpose of oxidizing aluminum. Thereafter, aluminum was vapor-deposited to a thickness of 1 nm to thereby form an aluminum layer 322 as schematically shown in FIG. 5C. Although there was no possibility that the facetting shown in FIG. 4 would be produced, since the wettability of aluminum to the surface of alumina was insufficient, aluminum grains were caused to generate, thus forming an aluminum film 322 which was rather closer to a polycrystalline thin film. Thereafter, oxygen was introduced into the vacuum device to thereby form an aluminum oxide layer 322 through the oxidation of the aluminum film 322. However, a varied degree of oxidation was admitted along the grain boundary. Namely, it was found through the measurement employing STM/AFM that there were pin-holes originating from the grain boundary or the non-uniformity of tunnel barrier height, thereby making it impossible to obtain an excellent tunnel barrier property.

Under the circumstances, in the present invention, the "two-stage oxidation method" as shown in FIG. 6 has been developed. FIGS. 6A and 6B show a process wherein an aluminum oxide layer 330 having a thickness of 1.3 nm or less was formed in the same manner as shown in FIG. 3. Then, as shown in FIG. 6C, aluminum was vapor-deposited without performing the purging of the ultra-high vacuum device and with a constant partial pressure of oxygen being maintained therein. As a result, an aluminum oxide layer 333 was formed directly from the aluminum flux as shown in FIG. 6C. According to this method wherein the aluminum oxide layer 333 is deposited on the same material, i.e. the aluminum oxide layer 330, the generation of crystal grain boundary originating from the insufficiency of wettability can be suppressed, thereby making it possible to obtain a tunnel barrier layer which is very homogenous and excellent in surface flatness. According to this method, excellent tunnel barrier properties were observed in the tunnel barrier layers having a film thickness ranging from 1 nm to 3 nm with the excellent homogeneity and flatness thereof being maintained. According to this method, there is no limitation in principle with respect to the upper limit of film thickness.

It should be noted that when the processes of FIGS. 6A and 6B are omitted, it is impossible to obtain an excellent tunnel barrier layer, even if the formation of aluminum oxide layer is performed as shown in FIG. 6C by exposing the (001) Fe plane of the surface of the magnetic layer 211 to an oxygen atmosphere. Because, since aluminum oxide is poor in wettability to the (001) Fe plane, grains would be generated in the aluminum oxide layer. Therefore, it is imperative to form in advance a thin (not more than 1.3 nm in thickness) aluminum oxide layer 330 as shown in FIG. 6B.

As explained with reference to FIG. 3, as long as the film thickness of aluminum is confined to not more than 1 nm, it is always possible to form an excellent aluminum oxide layer 330 on almost all kinds of magnetic layer, i.e. irrespective of the kind of material and the orientation of crystal face. Therefore, the method employing the aforementioned two-stage oxidation is optimum and indispensable for the tunnel barrier-forming method of the present invention wherein electrons having a specific wavevector are taken up from any optional material.

For example, in the method shown in FIG. 4, if a surface which is capable of lattice-matching with the (111) plane of aluminum is employed as the surface of the magnetic layer 211, the (111) plane of aluminum will be formed from the beginning instead of forming the (001) plane thereof. In this case, the facetting would not be generated and hence a flat tunnel barrier can be obtained. However, since the crystal orientation or materials of the magnetic layer 211 are limited and it is impossible to optionally select other orientations, this method is not useful in the present invention. In other words, the aforementioned two-stage oxidation method is indispensable for realizing the method of the present invention wherein tunneling electrons having a specific wavevector are taken up by taking advantage of the selectivity of wavevector.

In the aforementioned two-stage oxidation method, the oxidation of aluminum was performed through the natural oxidation thereof by the oxygen that had been introduced into an ultra-high vacuum device. However, it was also possible to form a tunnel barrier layer having a high barrier height by performing the oxidation of aluminum in an atmosphere containing UV ozone or oxygen radicals generated from oxygen plasma. It was possible according to this method to increase the changes of tunneling magnetoresistance to twice as high as that to be derived from the natural oxidation.

The aforementioned two-stage oxidation method may be said to be a method for ensuring the flatness, and also a method for enabling a very thin film of dielectric tunnel barrier to be formed by eliminating the projection and recess of atomic size level from the surface of layer. In this respect, the two-stage oxidation method is especially effective when the value of tunnel resistance of TMR element is desired to be minimized. Further, the two-stage oxidation method is also useful as a method of precisely controlling the value of tunnel resistance in the range of eight figures.

In summary, this "two-stage oxidation method", can be defined as being a method of forming an aluminum oxide thin film, the method comprising a first stage wherein an aluminum film having a thickness of 1 nm or less is formed on the surface of a magnetic metal by taking advantage of the excellent wettability of aluminum to the surface of main metals, the resultant aluminum oxide film formed by subsequent natural oxidization of the aluminum or oxidization of the alminum by oxygen radical; and a second stage wherein an aluminum oxide thin film is deposited directly from an aluminum flux in an oxygen atmosphere or an atmosphere of oxygen radical.

As explained above, the tunneling magnetoresistive element according to the present invention comprises a multi-layer film composed of a first magnetic layer, a tunnel barrier layer, and a second magnetic layer, which are successively deposited in the mentioned order, wherein said first magnetic layer is formed of a ferromagnetic material having a bcc structure, and a junction plane between said first magnetic layer and said tunnel barrier layer is constituted by (211) plane or (110) plane of said first magnetic layer.

As for the ferromagnetic material having a bcc structure, it is possible to employ an iron-cobalt alloy, an iron-nickel alloy, an iron-chromium alloy, an iron-rhodium alloy, an iron-platinum alloy, an iron-palladium alloy, an iron-iridium alloy and an iron-vanadium alloy. Further, the second magnetic layer can be constituted by iron, nickel, cobalt or alloys thereof.

Alternatively, a tunneling magnetoresistive element according to the present invention comprises a multi-layer film composed of a buffer layer, a first magnetic layer, a tunnel barrier layer, and a second magnetic layer, which are successively deposited in the mentioned order on the surface of a substrate, and is characterized in that the first magnetic layer is formed of a ferromagnetic material having a bcc structure, and that a junction plane between the first magnetic layer and the tunnel barrier layer is constituted by (211) plane or (110) plane of the first magnetic layer.

In the case where the junction plane between the first magnetic layer and the tunnel barrier layer is constituted by (211) plane of the first magnetic layer, it is preferable that the buffer layer is constituted by a layer having A-plane of cobalt or a cobalt-chromium alloy each having an hcp structure, (211) plane of chromium having a bcc structure, (110) plane of gold having a fcc structure, (110) plane of magnesium oxide, (11-20) plane of sapphire or (001) plane of a titanium-chromium alloy having a bcc structure; or constituted by a multi-layer structure formed of a combination of two or more layers having two or more said planes.

In the case where the first magnetic layer is formed of single crystal, and the junction plane between the first magnetic layer and the tunnel barrier layer is constituted by (110) plane, it is preferable that the buffer layer is constituted by a layer having (110) plane of molybdenum having a bcc structure, (110) plane of tungsten having a bcc structure, (110) plane of tantalum having a bcc structure or (110) plane of chromium having a bcc structure; or constituted by a multi-layer structure formed of a combination of two or more layers having two or more said planes.

In the case where the first magnetic layer is formed of polycrystal, and the junction plane between the first magnetic layer and the tunnel barrier layer is constituted by (110) plane, it is preferable that the buffer layer is constituted by a layer having (111) plane of a metal having a fcc structure or (0001) plane of a metal having an hcp structure; or constituted by a multi-layer structure formed of a combination of two or more layers having two or more said planes.

The junction plane between the first magnetic layer and the tunnel barrier layer may be a crystal face having an inclined angle of not more than 10 degrees as measured from the (211) or (110) plane of the first magnetic layer.

Alternatively, a tunneling magnetoresistive element according to the present invention may be constructed such that the substrate is formed of a semiconductor substrate, and that said element comprises a multi-layer film wherein an amorphous thin film layer formed of at least one kind of film selected from the group consisting of silicon oxide film, aluminum oxide film and other metal oxide films is interposed between the buffer layer and the semiconductor substrate.

As explained in the paragraph of prior art, the existence of difference in coercivity between the first magn etic layer and the second magnetic layer is indispensable for the development of the tunneling magnetoresistive effect. Therefore, unless the coercivity of each magnetic layer is independently controlled so as to realize a required magnitude of coercivity in each magnetic layer, it would be impossible to obtain an effective tunneling magnetoresistive element. A required magnitude of difference in coercivity is ordinarily realized by suitably selecting the material of magnetic layers. However, if it is impossible to obtain an effective difference in coercivity through the selection of the material of each magnetic layer, the following method can be adopted.

Namely, if it is desired to provide the first magnetic layer with a higher coercivity, a magnetic layer having a higher coercivity than that of the first magnetic layer should be employed as a buffer layer. On the other hand, if it is desired to provide the second magnetic layer with a higher coercivity, a ferromagnetic layer or an anti-ferromagnetic layer having a higher coercivity than that of the second magnetic layer should be deposited on the second magnetic layer (Namely, on the surface of the second magnetic layer disposed opposite to the tunnel barrier layer).

The tunneling magnetoresistive element according to the present invention is suited for use in a magnetic head. Further, the tunneling magnetoresistive element according to the present invention is suited for use as an element of a magnetic memory comprising a plurality of tunneling magnetoresistive elements which are arrayed in a matrix pattern, means for selectively applying a magnetic field onto each tunneling magnetoresistive element, and means for selectively detecting the resistance of each tunneling magnetoresistive element.

According to the present invention, there is also provided a method of manufacturing a magnetic head comprising a multi-layer film composed of a first magnetic layer, a tunnel barrier layer, and a second magnetic layer, which are successively deposited in the mentioned order, the method being characterized in that a ferromagnetic material having a bcc structure is employed as the first magnetic layer, that an aluminum film having a thickness of 1 nm or less is formed on the (211) plane or (110) plane of the first magnetic layer, that the aluminum film is naturally oxidized or oxidized by oxygen radical to form an aluminum oxide film, and that an aluminum oxide film is formed on the first-mentioned aluminum oxide film directly from aluminum flux in an oxygen atmosphere or an atmosphere of oxygen radical to thereby form the tunnel barrier layer.

According to the present invention, there is also provided a method of manufacturing a magnetic memory comprising a plurality of tunneling magnetoresistive elements each comprising a multi-layer film composed of a first magnetic layer, a tunnel barrier layer, and a second magnetic layer, which are laminated in the mentioned order; means for selectively impressing a magnetic field onto each tunneling magnetoresistive element; and means for selectively detecting the resistance of each tunneling magnetoresistive element; the method being characterized in that a ferromagnetic material having a bcc structure is employed as the first magnetic layer, that an aluminum film having a thickness of 1 nm or less is formed on the (211) plane or (110) plane of the first magnetic layer, that the aluminum film is naturally oxidized or oxidized by oxygen radical to form an aluminum oxide film, and that an aluminum oxide film is formed directly from an aluminum flux on the first-mentioned aluminum oxide film in an oxygen atmosphere or an atmosphere of oxygen radical to thereby form the tunnel barrier layer.

DETAILED DESCRIPTION OF THE INVENTION

Next, various embodiments of the present invention will be explained with reference to drawings.

EXAMPLE 1

Figure 1:
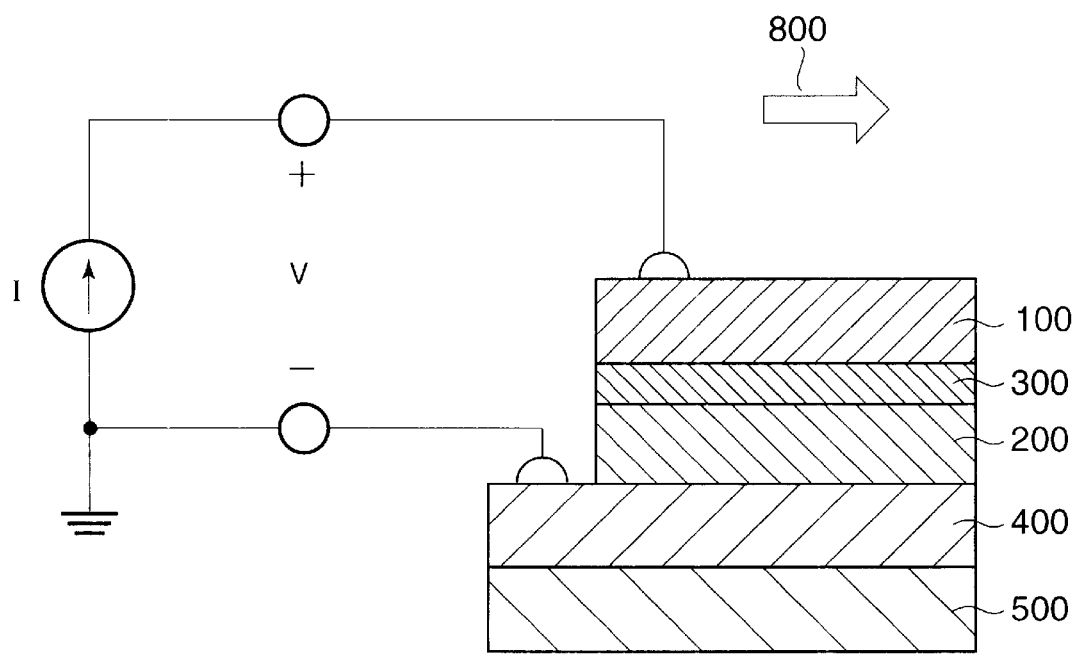
FIG. 1 is a cross-sectional view schematically illustrating the structure of a tunneling magnetoresistive element.
Figure 2:
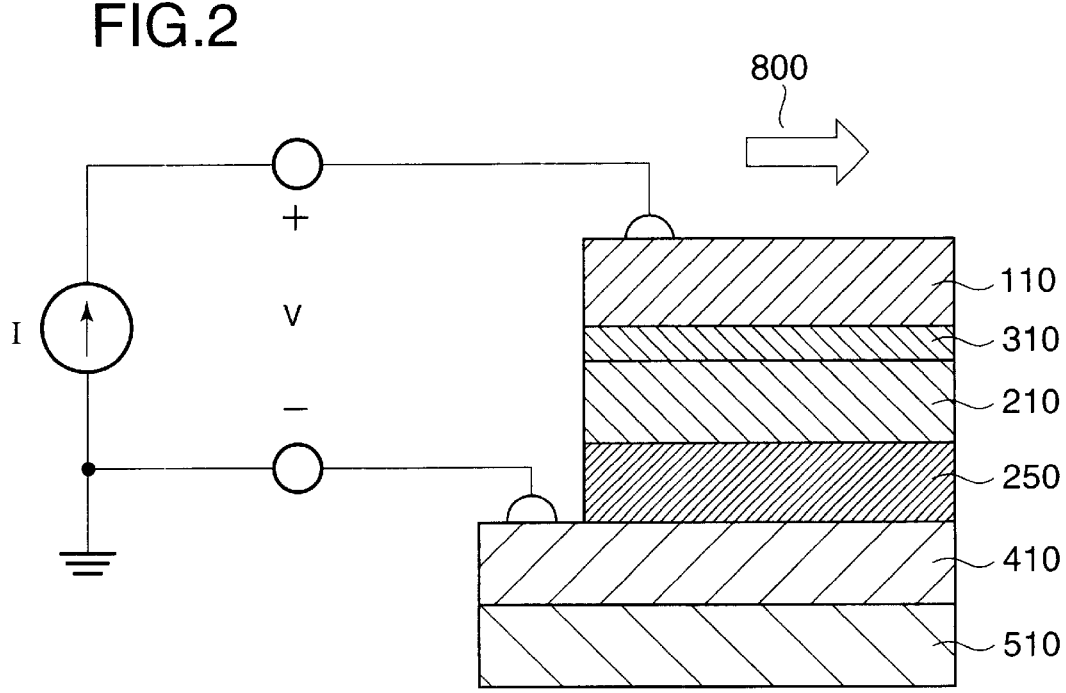
FIG. 2 is a cross-sectional view schematically illustrating the structure of a tunneling magnetoresistive element according to the present invention.
Figure 3A:
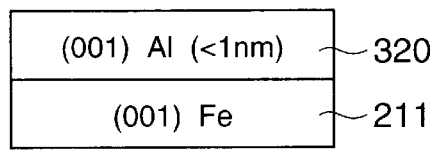
FIGS. 3A and 3B are cross-sectional views illustrating a method of forming a very thin aluminum oxide film having a thickness of not more than 1.3 nm.
Figure 3B:
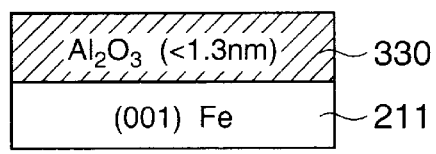
Figure 4A:
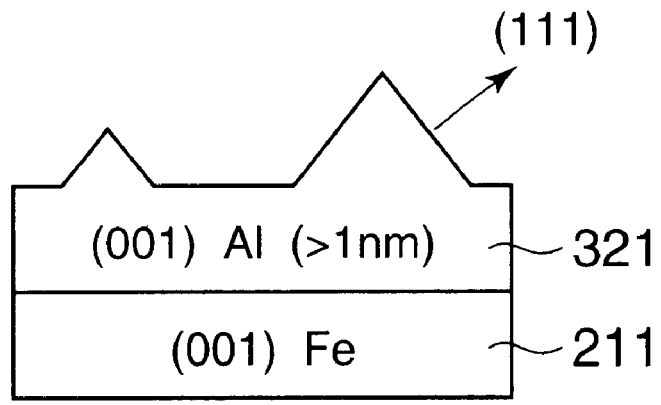
FIGS. 4A and 4B are cross-sectional views illustrating the mechanism of generating facetting on the occasion of forming a very thin aluminum oxide film having a thickness of not less than 1.3 nm.
Figure 4B:
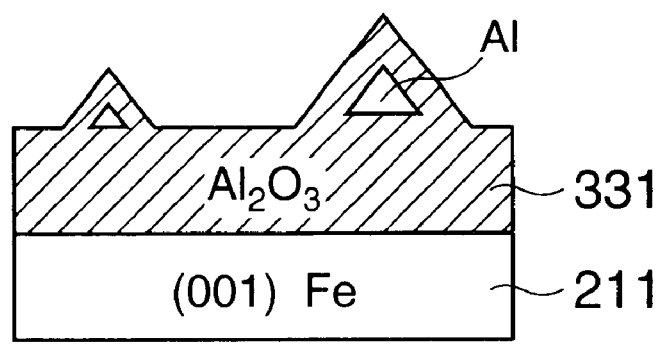
Figure 5A:
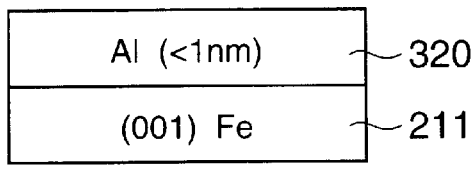
FIGS. 5A to 5D are cross-sectional views illustrating the mechanism of deteriorating aluminum oxide film due to the crystal grain to be generated on the occasion of forming a very thin aluminum oxide film having a thickness of not less than 1.3 nm.
Figure 5B:
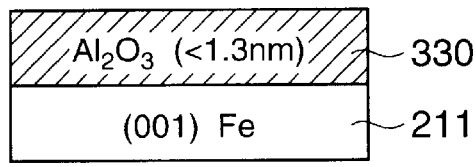
Figure 5C:
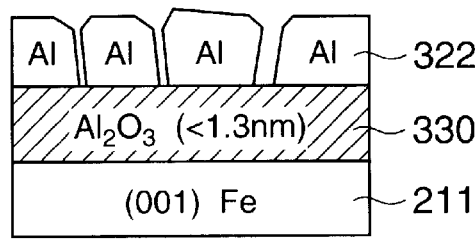
Figure 5D:
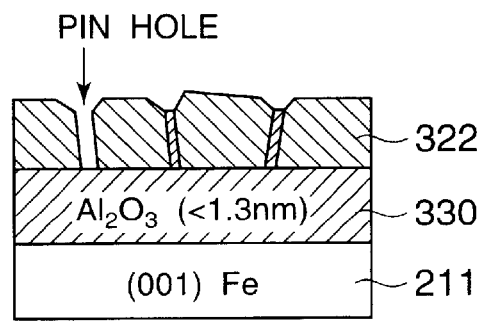
Figure 6A:
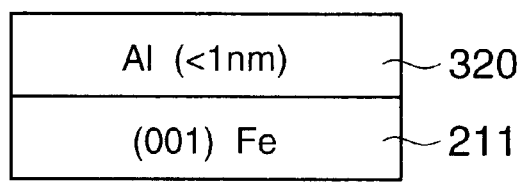
FIGS. 6A to 6C are cross-sectional views illustrating the method of forming a very thin aluminum oxide film having a thickness of not less than 1.3 nm by means of a two-stage oxidation method.
Figure 6B:
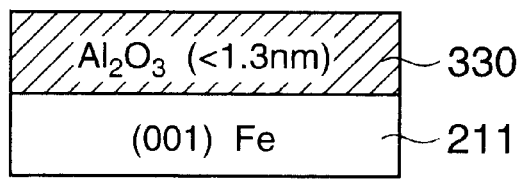
Figure 6C:
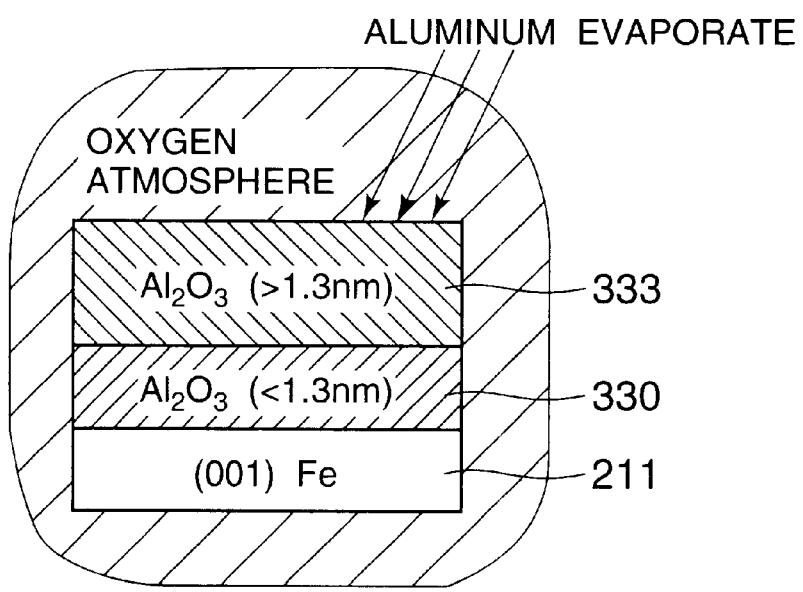
Figure 7:
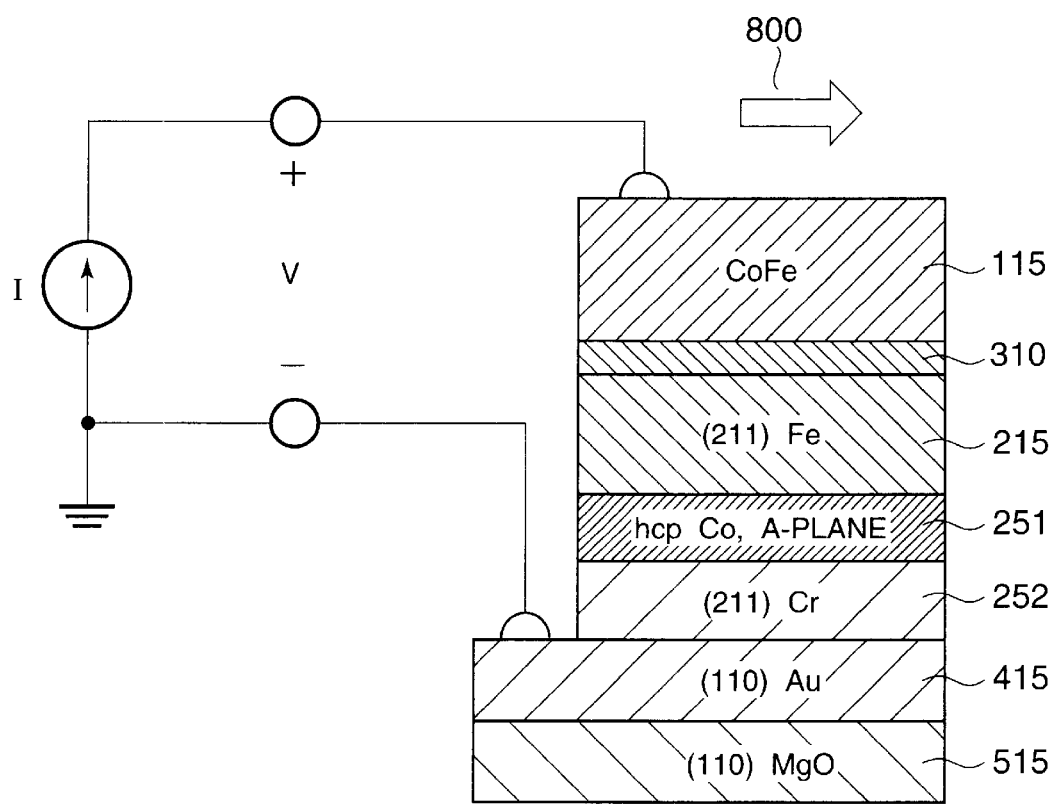
FIG. 7 is a cross-sectional view schematically illustrating one example of TMR element according to the present invention.

FIG. 7 is a cross-sectional view schematically illustrating one embodiment of TMR element of the present invention. In the case of the TMR element shown in FIG. 7, the electron tunneling from the magnetic layer 215 having Fe (211) plane and exhibiting a wavevector which was perpendicular to the Fe (211) plane was exclusively employed. The tunnel barrier layer 310 was formed by the aforementioned two-stage oxidation method, and the magnetic layer 115 was formed on the surface of the tunnel barrier layer 310 by making use of a CoFe thin film having (110) plane. In this example, the magnetic layer 215 having Fe (211) plane constituted a soft magnetic layer, and the magnetic layer 115 having CoFe (211) plane constituted a hard magnetic layer, thereby constituting a spin valve. By the way, the expressions of soft magnetic layer and hard magnetic layer are employed herein only for the convenience of comparison.

The magnetic layer 215 having Fe (211) plane and a thickness of 5 nm was formed on a buffer layer consisting of two layers which were formed by successively depositing a chromium (Cr) layer 252 having a thickness of 10 nm and (211) plane and a Co layer 251 of hcp structure having a thickness of 50 nm and Aplane. This 2-ply buffer layer was in turn formed on a gold (Au) layer functioning as a lead wire layer 415 and having a thickness of 100 nm and (110) plane. By the way, this gold layer having (110) plane (i.e. the lead wire layer 415) can be formed by making use of a substrate 515 having MgO (110) plane. This construction is one example which is designed to control the planar orientation of the magnetic layer 215 through a combination of the buffer layers 251 and 252, the lead wire layer 415 and the substrate 515.

By the way, the Co layer 251 of hcp structure also functions to determine the coercivity of the magnetic layer 215 having Fe (211) plane. If gold (which is a non-magnetic material) having (110) plane is employed in place of the Co layer 251 of hcp structure, the magnetic layer 215 having Fe (211) plane would be enabled to grow, and additionally, a soft magnetic layer having an inherently smaller coercivity can be obtained. It is also possible, if an anti-ferromagnetic material is employed, to enlarge the coercivity of the Fe magnetic layer 215.

Figure 8:
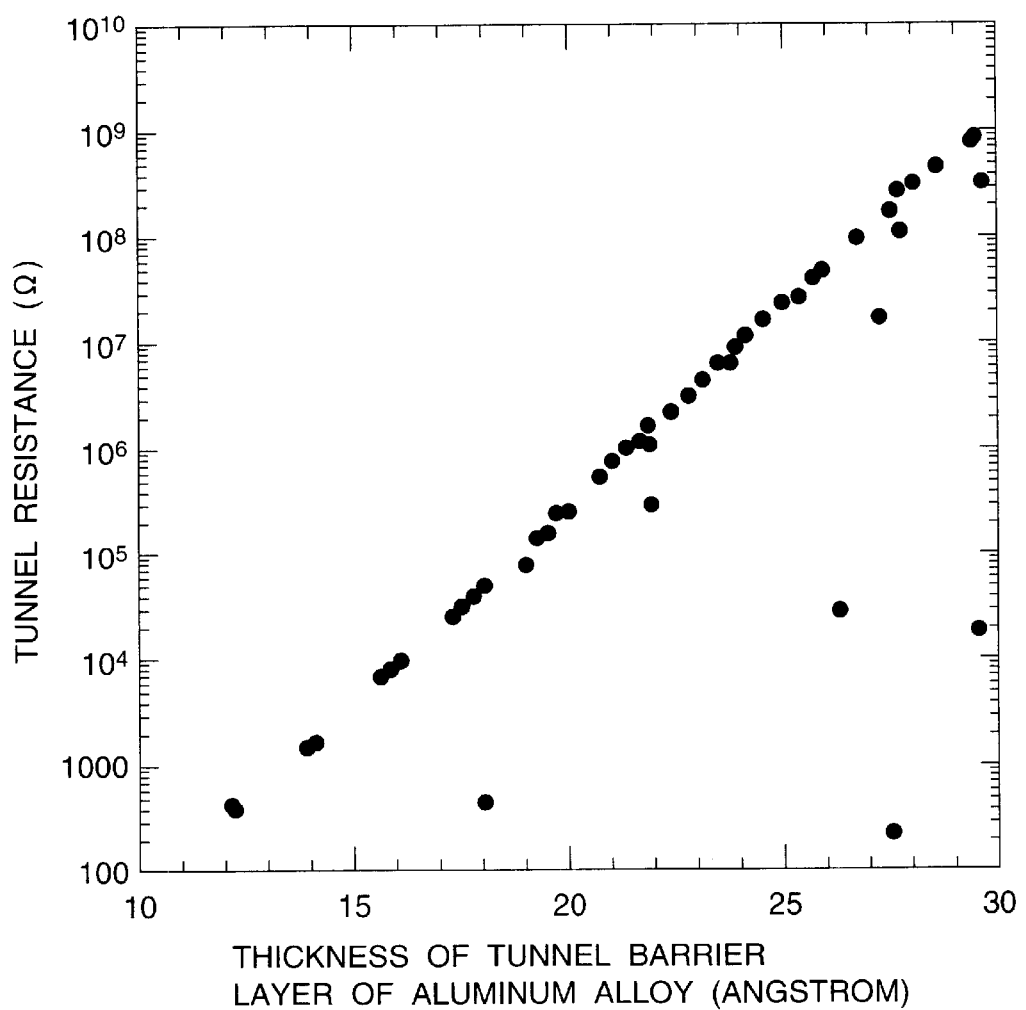
FIG. 8 is a graph illustrating the relationship between the tunnel resistance of TMR element wherein Fe (211) plane is employed and the thickness of tunnel barrier.

According to the construction of the TMR element shown in FIG. 7, a large number of TMR elements, each having a tunnel barrier layer 310 whose thickness was varied in the range of 1 to 3 nm, were manufactured to measure the tunnel resistance as well as changes of tunnel resistance relative to changes of external magnetic field. The results thereof are shown in FIG. 8 wherein the abscissa thereof represents the thickness of tunnel barrier layer in the TMR element, and the ordinate thereof represents the logarithm of value of tunnel resistance. The black points in FIG. 8 represent respectively measured data of each device. The measurement was performed at room temperature. In this case, a DC voltage of 0.05V was applied to each sample having a tunnel barrier layer of different thickness from the others to measure the electric current and to determine the tunnel resistance. The tunnel resistance was exponentially increased as the thickness of the tunnel barrier layer was increased, the values being changed within the range of about six figures. The relationship that the tunnel resistance was changed exponentially with the changes in thickness of the tunnel barrier indicates the fact that the electric conduction was caused to generate due to the phenomenon of tunneling. This demonstrates the fact that the two-stage oxidation method is effective in giving an excellent tunnel barrier layer which is free from pin-hole.

Figure 9:
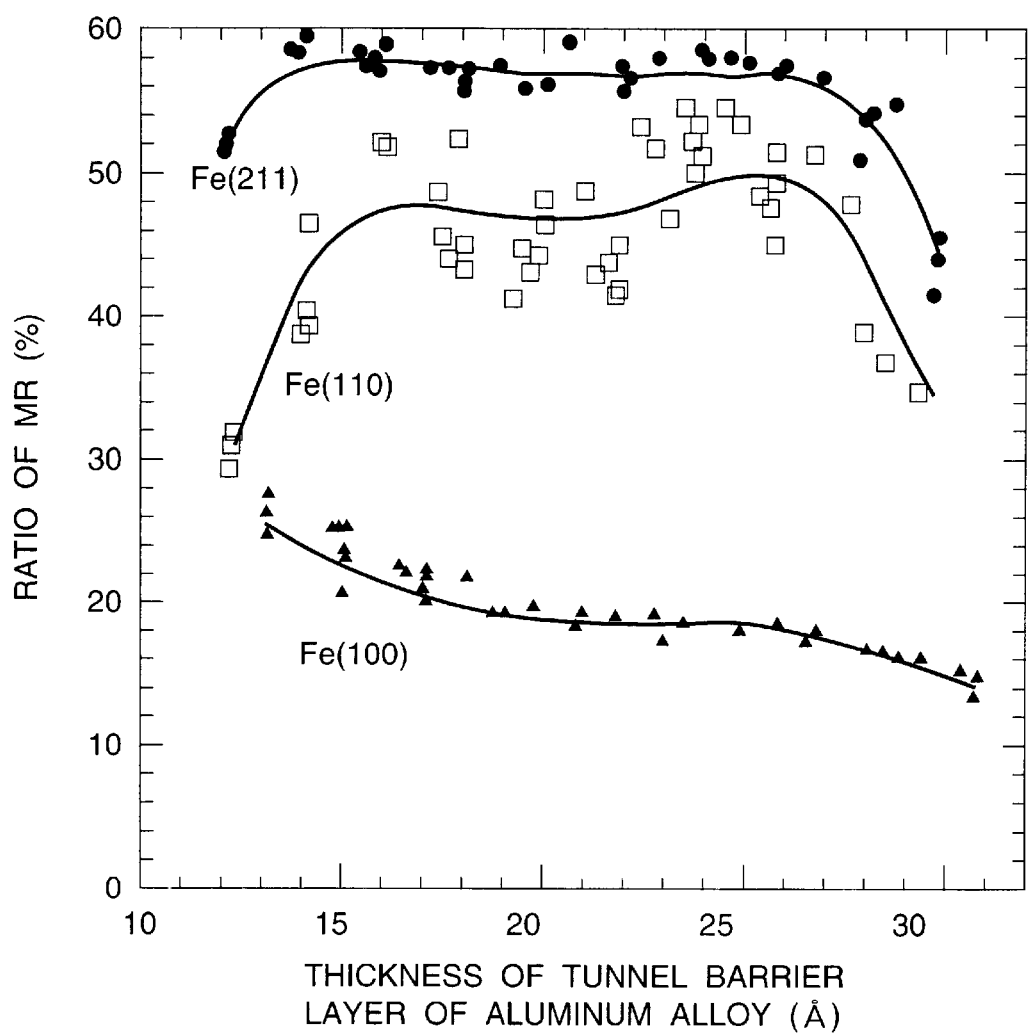
FIG. 9 is a graph illustrating the relationship between the tunnel magnetoresistance of TMR element having a different planar orientation and the thickness of tunnel barrier.

These TMR elements indicated a change of about 60% in tunnel magnetoresistance almost irrespective of the thickness of the tunnel barrier layer which was varied within the range of 1 to 3 nm. FIG. 9 shows the results thereof, wherein the abscissa thereof represents the thickness of tunnel barrier layer in the TMR element, and the ordinate thereof represents the decrease of tunneling magnetoresistance (MR) which is shown by percentage. The black points in FIG. 9 represent respectively measured data of each device. The measurement was performed at room temperature. In this case, a DC voltage of 0.05V was applied to each sample having a tunnel barrier layer of different thickness from the others to measure the electric current and to observe the tunnel resistance, thus determining the tunneling magnetoresistance. FIG. 9 also shows the results which were obtained when the same measurement was performed also on the Fe (110) plane and on the Fe (100) plane. These results clearly indicate the fact that there was certainly existed a planar orientation dependency of the magnetic layer 215, and as a result of this, the tunneling magnetoresistance was apparently changed by factor of three or more.

The value of change in magnetoresistance obtainable in the present invention was three times as high as the value of change that is reported in the aforementioned Publication 1 where the anisotropy of the magnetic layer was not taken in to account. This fact certainly demonstrates the usefulness of the method of the present invention wherein the anisotropy of the magnetic layer 215 is positively utilized and hence only the tunneling electron of the orientation having a large polarizability is selected by taking advantage of the wavevector selectivity of the tunnel barrier.

It is indicated in the Publication 1 that since the controllability of tunnel barrier layer is insufficient, the value of inter-terminal resistance of TMR element is inevitably confined to the order of kilo-ohm, and that if it is tried to decrease this inter-terminal resistance, it would lead to a sharp decrease in the magnitude of change of tunneling magnetoresistance. Examples of TMR element having a small inter-terminal resistance in Applied Physics Letters, Vol. 71, No.22, 1997, pp.3296–3298 (Publication 6); H. Tsuge and T. Mitsuzuka. However, the magnitude of changes of tunneling magnetoresistance obtainable in these examples is about $\frac{1}{12}$ of that of the TMR element having the same degree of small interterminal resistance that can be manufactured by the present invention.

As explained above, according to the TMR element of the present invention, the inter-terminal resistance thereof can be controlled within the range of from at least $100\Omega/mm^2$ to $100M\ \Omega/mm^2$ without sacrificing the magnitude of the changes of tunneling magnetoresistance. This characteristic is very important in view of the application of TMR element to a magnetic read/write head or magnetic memory wherein the operation thereof with lower resistance is desired.

The similar effect as disclosed in this example can be obtained even if all of the substrate 515, the lead wire layer 415 and buffer layer 251 are constituted by sapphire having $Al_2O_3$ (11-21) plane, Ag (110), Pt (110), Mg (110) etc. Further, the upper magnetic layer 115 may be constituted by an amorphous magnetic body such as a-$Co_{80}$FeBSi, or by a ferromagnetic alloy such as FeNi.

EXAMPLE 2

When Fe (110) plane is employed as the magnetic layer 215 of Example 1, a TMR element according to a second, example and having a somewhat smaller MR value as compared with the TMR element of Example 1 can be obtained. In this example, for the purpose of obtaining Fe (110) plane, the A-plane of sapphire substrate was employed as the substrate 510, and a molybdenum layer having (110) plane for constituting both of buffer layer 250 and lead wire layer 410 was formed. Then, a magnetic layer 210 was formed using the molybdenum layer as a direct buffer layer.

In the same manner as described in Example 1, a large number of TMR elements, each having a tunnel barrier layer 310 whose thickness was varied in the range of 1 to 3 nm, were manufactured to measure the tunnel resistance as well as changes of tunnel resistance relative to changes of external magnetic field. The results thereof were the same as shown in FIG. 8. It was confirmed that the two-stage oxidation method is effective, irrespective of the planar orientation of the underlying layer, in giving an excellent tunnel barrier layer which is free from pin-hole.

The changes in tunnel magnetic resistance of the TMR elements, the tunnel barrier layer thereof being varied in thickness from 1 to 3 nm, were measured in the same manner as that of Example 1. FIG. 9 shows the results thereof, wherein each white square symbol (□) represents the result measured of each of the TMR element of this example. The TMRI element of this example wherein Fe (110) plane was employed indicated somewhat inferior TMR value. However, in view of the possibility that this element can be manufactured on the surface of sapphire substrate, this element is useful depending on the end-use thereof.

EXAMPLE 3

Figure 10:
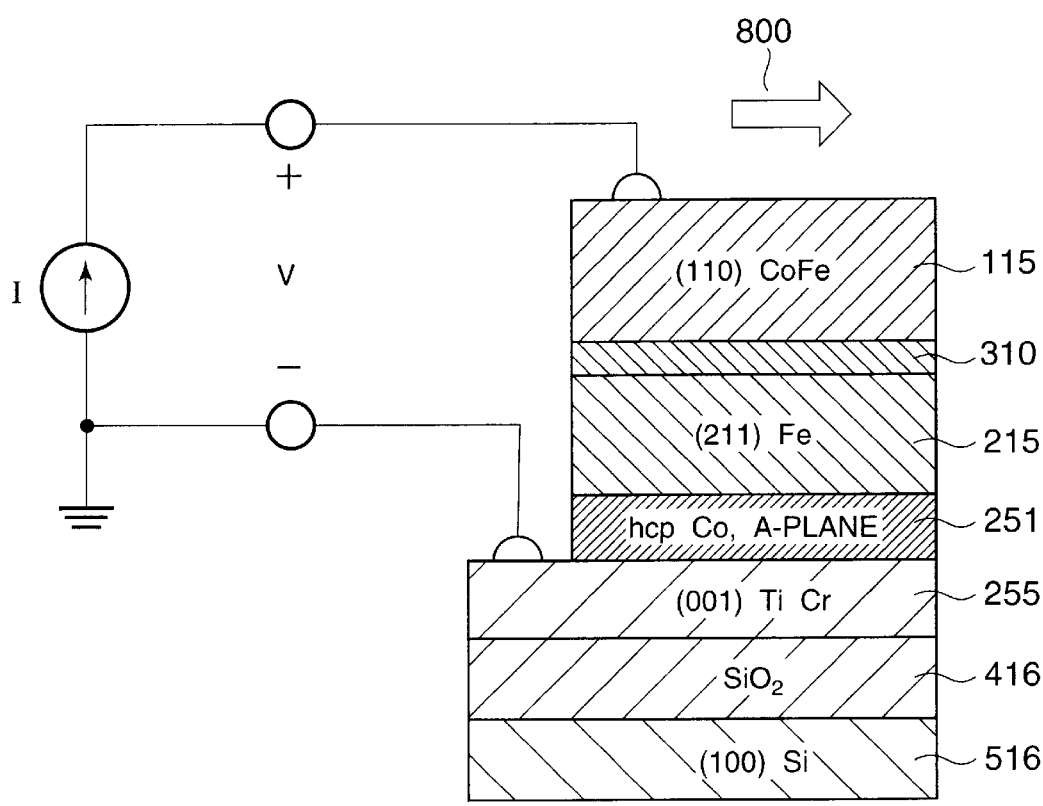
FIG. 10 is a cross-sectional view schematically illustrating another example of TMR element according to the present invention.

FIG. 10 is a cross-sectional view schematically illustrating another example of TMR element according to the present invention. In this TMR element shown in FIG. 10, a magnetic layer 215 having Fe (211) plane is formed on a Co layer 251 having A-plane and employed as a buffer layer. In this respect, the construction is the same as that of Example 1. However the construction of TMR element of this example differs from that of Example 1 in the respect that Si is employed as the substrate 516. Namely, in this example, an $SiO_2$ thermal oxide film layer 416 is formed on (100) Si substrate 516 and then (001) TiCr layer functioning also as a lead wire is formed as a buffer layer 255 on the $SiO_2$ thermal oxide film layer 416, this buffer layer 255 being connected with the aforementioned buffer layer 251. The (001) TiCr layer can be epitaxially grown even on the surface of an amorphous underlayer, i.e. the $SiO_2$ thermal oxide film layer 416, so that this plane is convenient for growing the magnetic layer 215 having, as a growing plane, Fe (211) plane. Since the combination of (110) CoFe layer 115 for constituting the TMR element, the magnetic layer 215 having Fe (211) plane, and the tunnel barrier layer 310 to be formed by means of the two-stage oxidation method in this example was the same as that of Example 1, the same results as obtained in Example 1were obtained.

This example demonstrates the fact that the TMR element of the present invention can be manufactured on a silicon substrate, thereby opening a way to manufacture a magnetic read/write head, a magnetic random access memory (MRAM), etc. by making use of the conventional silicon micro fabrication techniques. Further, since a silicon substrate is advantageous in that an excellent crystal thereof can be obtained at a lower cost as compared with other dielectric substrates such as MgO or sapphire and that the heat conductance thereof is larger as compared with the aforementioned dielectric substrates, the thermal load on the occasion of the magnetic layers processing can be reduced and at the same time, the control of operating temperature of TMR element can be facilitated.

EXAMPLE 4

Figure 11:
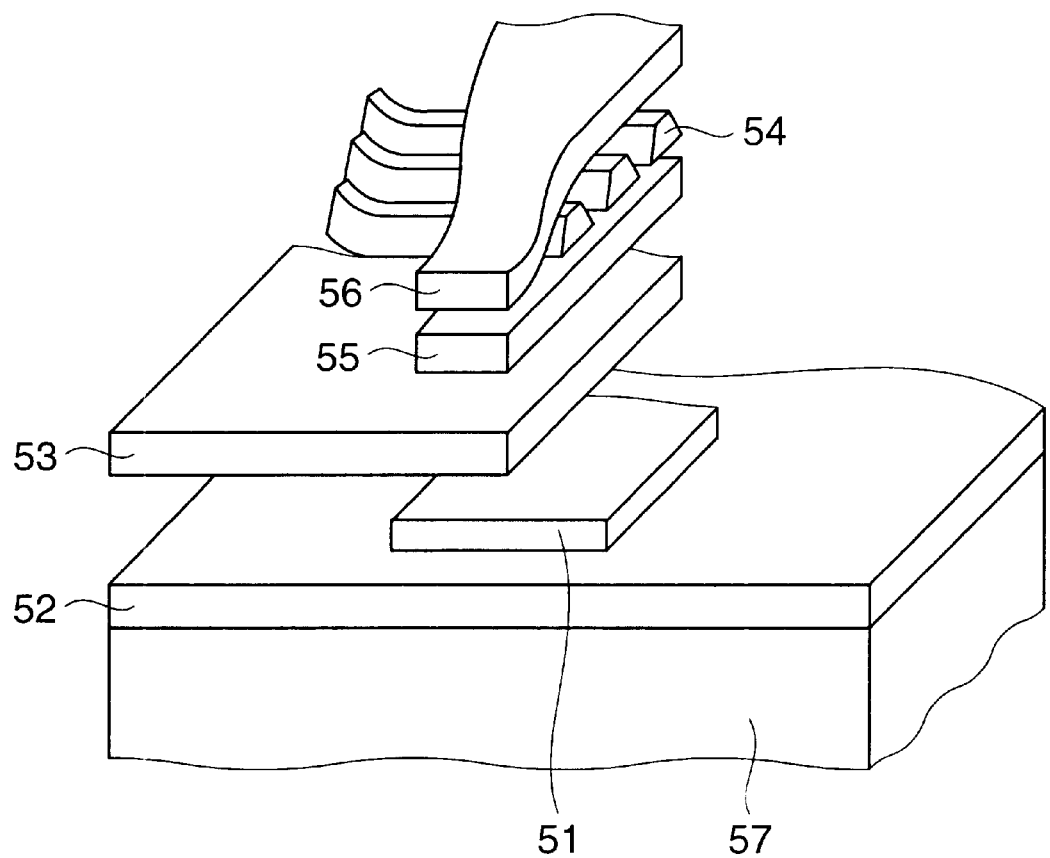
FIG. 11 is a perspective view illustrating a magnetic read/write head employing a TMR element according to the present invention.

By making use of the TMR element obtained in Example 3, a magnetic read/write head was manufactured. The construction of this magnetic read/write head will be illustrated below. FIG. 11 is a perspective view illustrating the read/write head which is partially cut off. The portion where a TMR element 51 is sandwiched by shielding layers 52 and 53 is designed to be functioned as a read head, and the portions of a lower magnetic pole 55 and an upper magnetic pole 56 sandwiching a coil 54 is designed to be functioned as a recording head.

Referring to FIG. 11, a sintered material containing $Al_2O_3$/TiC as a main component was employed as a substrate 57 for a slider. Then, as a buffer layer, an $SiO_2$ layer was formed on the surface of the substrate 57 by means of sputtering method, after which the TMR element described in Example 3 was manufactured by means of a molecular beam epitaxial method (MBE). As for both of the shield layer and recording magnetic pole, Ni-20 at % Fe alloy was employed for the manufacture thereof by means of sputtering method. The film thickness of each magnetic layer was set to as follows. The thickness of both upper and lower shielding layers 52 and 53 was set to 1 $\mu$m, and the thickness of both upper and lower magnetic poles 56 and 55 was set to 3 $\mu$m. As a gap material between neighboring layers was formed by means of sputtering using alumina. The film thickness of the gap layer was 0.2 $\mu$m at a region between the shielding layer and the magnetoresistive element, and 0.4 $\mu$m at a region between the recording magnetic poles. The interval between the read head and the recording head was set to about 4 $\mu$m, and the gap layer interposed therebetween was constituted also by alumina. As for the coil 54, a Cu film having a thickness of 3 $\mu$m was employed.

Since the sensitivity of TMR element can be improved by the present invention, the sensitivity of magnetic head can be improved, thereby making it possible to detect the magnetized state of magnetic domain of smaller size, and hence to improve the recording density by about ten times as compared with the conventional one.

EXAMPLE 5

An example of the application of TMR element of the present invention to a magnetic memory will be explained with reference to FIGS. 12 to 15. In each of the manufacturing process illustrated in FIGS. 12 to 15, A represents a schematical plan view and B represents a schematical sectional view. The magnetic memory according to this example has a structure which is similar to that shown in IEEE Transaction on Magnetics, Vol. 33, No. 6, November, 1997, pp.4498–4512 (Publication 7).

Figure 12A:
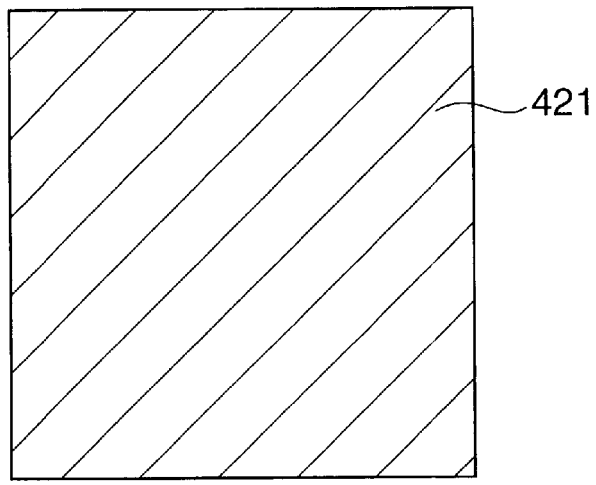
FIG. 12A is a plan view and FIG. 12B is a cross-sectional view schematically illustrating the manufacturing steps of magnetic memory employing a TMR element according to the present invention.
Figure 12B:
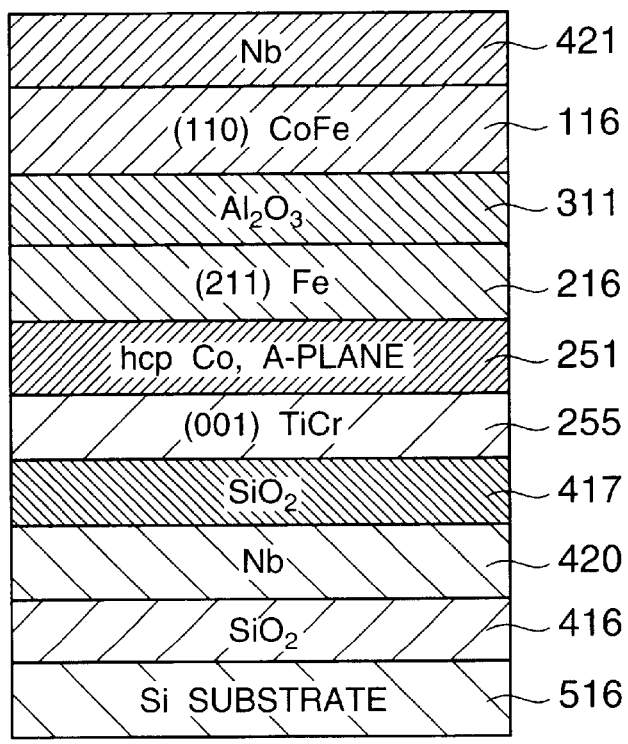
Figure 13A:
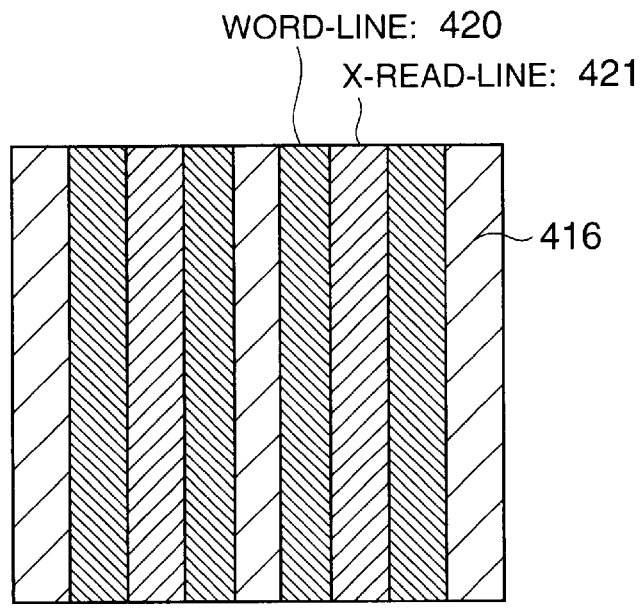
FIG. 13A is a plan view and FIG. 13B is a cross-sectional view schematically illustrating the manufacturing steps of magnetic memory employing a TMR element according to the present invention.
Figure 13B:
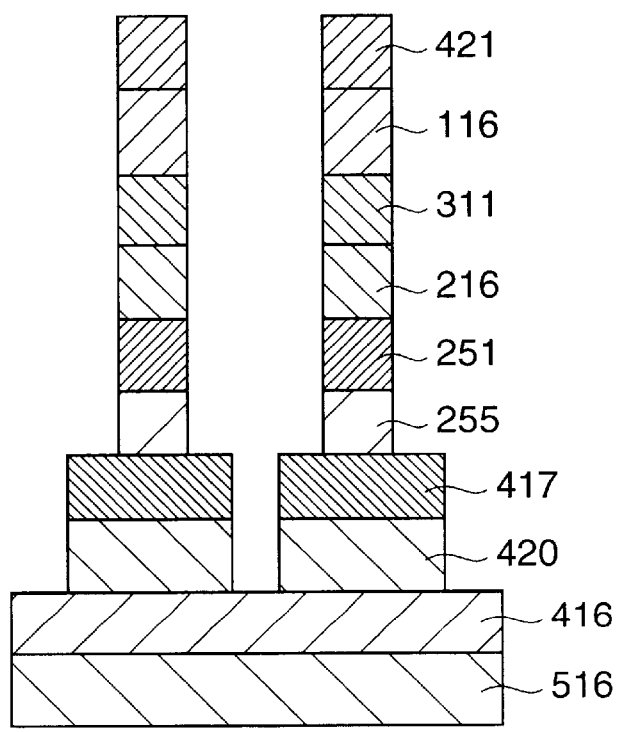

First of all, as shown in FIG. 12, an insulating layer 416, a word line layer 420, an interlayer insulating layer 417, a buffer layer 255, a buffer layer 251, a soft magnetic layer 216, a tunnel barrier layer 311, a hard magnetic layer 116 and a contact layer 421 were successively deposited on a silicon substrate 516. Then, by making use of lithographic process, a word line pattern was formed by etching the word line layer 420 and all of other layers disposed over the word line layer 420. Further, by means of a similar lithographic process, an X lead line pattern was formed by etching the buffer layer 255 and all of other layers disposed over the buffer layer 255.

Figure 14A:
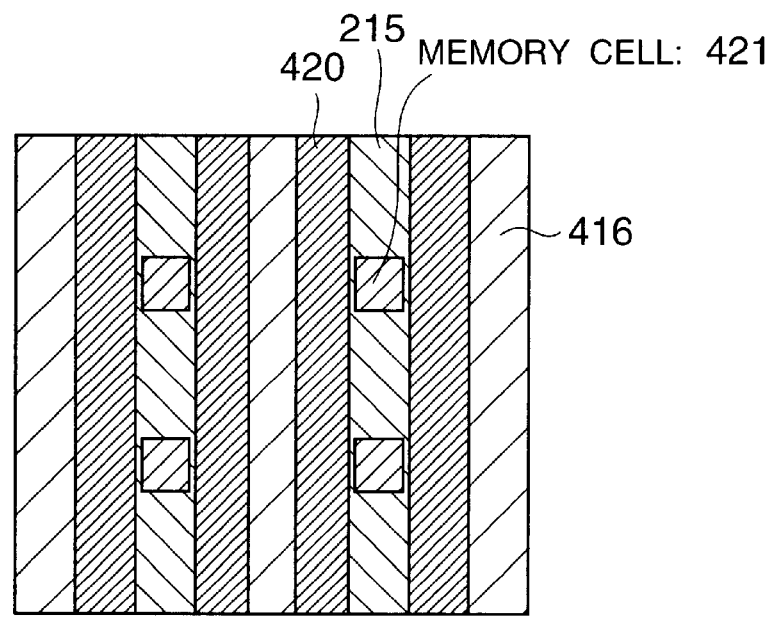
FIG. 14A is a plan view and FIG. 14B is a cross-sectional view schematically illustrating the manufacturing steps of magnetic memory employing a TMR element according to the present invention.
Figure 14B:
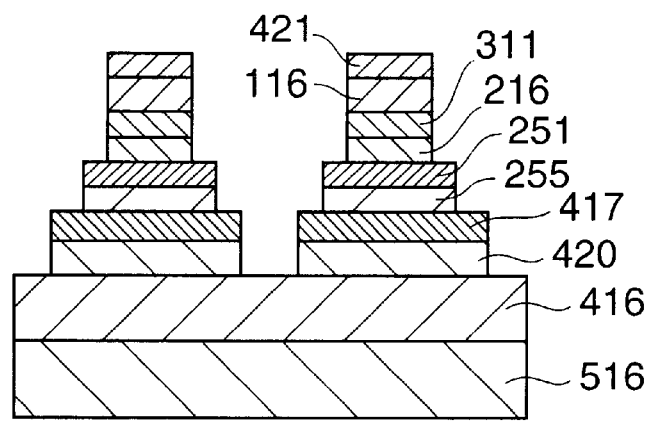
Figure 15A:
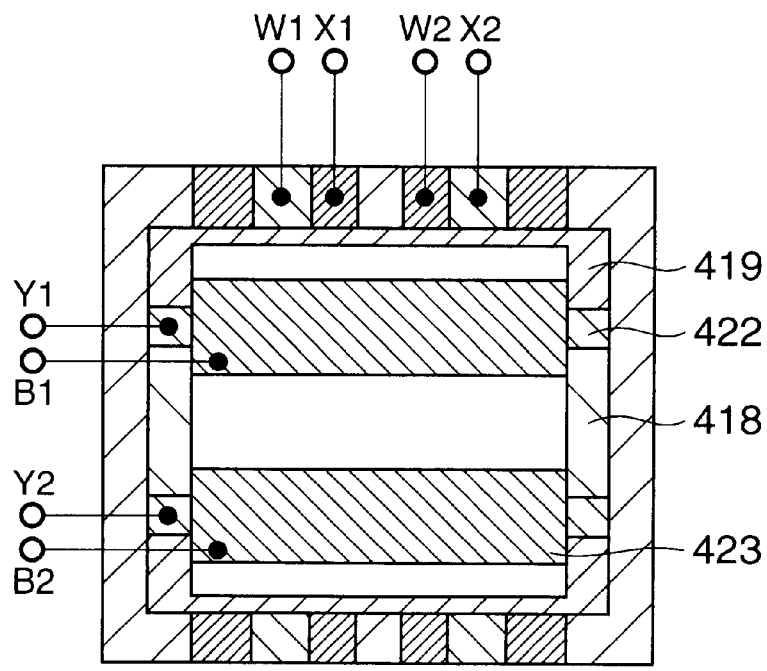
FIG. 15A is a plan view and FIG. 15B is a cross-sectional view schematically illustrating the manufacturing steps of magnetic memory employing a TMR element according to the present invention.
Figure 15B:
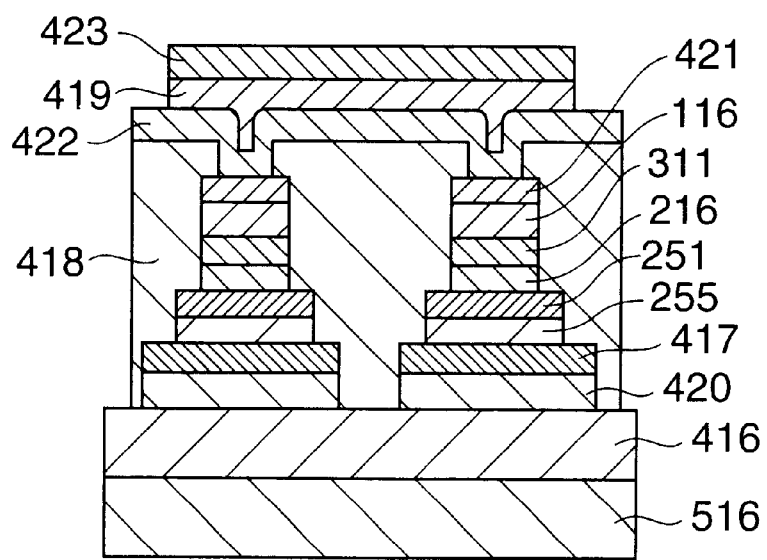

Then, as shown in FIG. 14, by means of lithography and etching process, all of the layers over the soft magnetic layer 216 were processed to form memory cell portions for storing each bit data. Thereafter, as shown in FIG. 15, an interlayer insulating layer 418 was formed to bury the aforementioned memory cell portions in the insulating layer, and then, a contact holes are formed over the memory cell portions. Then, a Y lead wire 422 which is enabled to electrically connect with the contact layer 421 via the contact holes was formed on the interlayer insulating layer 418. Thereafter, another interlayer insulating layer 419 was deposited thereon and further, bit lines 423 was formed on the interlayer insulating layer 419. Subsequently, the word line, the bit line, the X lead wire and the Y lead wire were respectively connected with peripheral devices to accomplish a random access memory.

The memory according to the present invention differs from the magnetic memory shown in the aforementioned Publication 7 in the respects that the TMR element of the present invention is employed at the memory cell portions and that a different driving system is employed. In the aforementioned memory cell, a spin valve is constituted by three layers consisting of the soft magnetic layer 216, the tunnel barrier layer 311 and the hard magnetic layer 116. The data of one bit was retained by the magnetization of the soft magnetic layer 216.

Referring to FIG. 15, on the occasion of determining the data of address (1, 1), a bias current is passed to a word line W1, and simultaneously, an electric current is passed to a bit line B1. Then, when the total of magnetic fields to be generated by these currents is larger than the switching magnetic field of the soft magnetic layer 216 in the memory cell, the magnetic field thus generated is allowed to generate only at the periphery of memory cell of the address (1, 1). Depending on the orientation of this magnetic field, 1 or 0 of the data written in the memory cell of the addressed (1, 1) is determined. In this writing operation, the magnetization of the hard magnetic layer 115 would not be changed, since the switching magnetic field thereof that has been set in advance is sufficiently larger than the switching magnetic field of the soft magnetic layer 215. Further, since there is no possibility that the magnetization of the soft magnetic layer 215 can be changed by only the magnetic field to be generated by the bias current of the word line W1, the magnetization of other memories on the word line W1 would never be changed. The reading of data can be performed by detecting a magnetic resistance between the X lead wire and the Y lead wire. Namely, by measuring the resistance between the X lead wire and the Y lead wire, the resistance of the memory cell of the address (1, 1) can be detected, thus making it possible to obtain the data of the address (1, 1).

In this example, the insulating layer 416 was formed of a silicon thermal oxide film, the word line layer 420 was formed of niobium, the interlayer insulating layer 417 was formed of a silicon oxide film that has been deposited through sputtering, the buffer layer 255 was formed of (001) TiCr, the buffer layer 251 was formed of A-plane of hcp-structure Co, the soft magnetic layer 216 was formed of Fe having (211) plane, the tunnel barrier layer 311 was formed of an alumina tunnel oxide film having a thickness of 1.2 nm and manufactured by means of the two-stage oxidation method, the hard magnetic layer 116 was formed of CoFe, and the contact layer 421 was formed of niobium (Nb). By the way, for the purpose of controlling the coercivity of the soft magnetic layer 216, the employment of aiCoFe alloy having a different composition would be effective.

Since the magnitude of changes in resistance of TMR element can be enhanced by the present invention, it becomes possible to store a data in the soft magnetic layer, thereby improving the detection sensitivity to the magnetization of memory cell. As a result, it is now possible to obtain a nonvolatile magnetic memory exhibiting a speed of about five times as high as that of the conventional memory.

According to the present invention, the existence of prominent anisotropy in the polarizability of magnetic crystal is noticed, and on the basis of this finding, only the tunneling electron having an orientation which is expected to secure a large polarizability is selected by taking the advantage of the wavevector selectivity of tunnel barrier, thereby realizing a very large magnitude of changes in tunneling magnetoresistance. As a result, it is now possible to realize a value of as high as 60% in changes of tunneling magnetoresistance, thereby making it possible to improve the sensitivity of magnetic sensor employing TMR element up to as high as three to ten times as compared with the conventional sensor. As a result, it is now possible to obtain a high-sensitivity magnetic read/write head, enabling the magnetic recording density to be improved by about ten times as high as that of the conventional one. Further, by making use of this TMR element, it is now possible to obtain a magnetic memory exhibiting a reading speed of at least five times as high as that of the conventional one.

What is claimed is:

1. A tunneling magnetoresistive element comprising;
   a multi-layer film composed of a first magnetic layer, a tunnel barrier layer, and a second magnetic layer, which are successively formed in the mentioned order;
   wherein a current flows between said first magnetic layer and said second magnetic layer through said tunnel barrier layer vertically with respect to a film plane;
   wherein electrons having a wavevector that is perpendicular to a junction plane between said first magnetic layer and said tunnel barrier layer are selectively tunneled from said first magnetic layer to said second magnetic layer; and
   wherein said first magnetic layer is formed of a ferromagnetic material having a bcc structure, and the junction plane between said first magnetic layer and said tunnel barrier layer is constituted by (211) plane or (110) plane of said first magnetic layer.

2. The tunneling magnetoresistive element according to claim 1, wherein said first magnetic layer is formed on a buffer layer.

3. The tunneling magnetoresistive element according to claim 2, wherein a junction plane between the first magnetic layer and the tunnel barrier layer is constituted by (211) plane of the first magnetic layer, the buffer layer is constituted by a layer having A-plane of cobalt or a cobalt-chromium alloy each having an hcp structure, (211) plane of chromium having a bcc structure, (110) plane of gold having a fcc structure, (110) plane of magnesium oxide, (11-20) plane of sapphire or (001) plane of a titanium-chromium alloy having a bcc structure; or constituted by a multi-layer structure formed of a combination of two or more layers having two or more said planes.

4. The tunneling magnetoresistive element according to claim 2, wherein the first magnetic layer is formed of a single crystal, and the junction plane between the first magnetic layer and the tunnel barrier layer is constituted by (110) plane, the buffer layer is constituted by a layer having (110) plane of molybdenum having a bcc structure, (110) plane of tungsten having a bcc structure, (110) plane of tantalum having a bcc structure or (110) plane of chromium having a bcc structure; or constituted by a multi-layer structure formed of a combination of two or more layers having two or more said planes.

5. The tunneling magnetoresistive element according to claim 2, wherein the first magnetic layer is formed of polycrystal, and the junction plane between the first magnetic layer and the tunnel barrier layer is constituted by (110) plane, the buffer layer is constituted by a layer having (111) plane of a metal having a fcc structure or (0001) plane of a metal having an hcp structure; or constituted by a multi-layer structure formed of a combination of two or more layers having two or more said planes.

6. The tunneling magnetoresistive element according to claim 1, wherein the junction plane between the first magnetic layer and the tunnel barrier layer is constituted by a crystal face having an inclined angle of not more than 10 degrees as measured from the (211) or (110) plane of the first magnetic layer.

7. A magnetic head comprising a multi-layer film composed of a first magnetic layer, a tunnel barrier layer, and a second magnetic layer, which are successively formed in the mentioned order;
   wherein a current flows between said first magnetic layer and said second magnetic layer through said tunnel barrier layer vertically with respect to a film plane;
   wherein electrons having a wavevector that is perpendicular to a junction plane between said first magnetic layer and said tunnel barrier layer are selectively tunneled from said first magnetic layer to said second magnetic layer; and
   wherein said first magnetic layer is formed of a ferromagnetic material having a bcc structure, and the junction plane between said first magnetic layer and said tunnel barrier layer is constituted by (211) plane or (110) plane of said first magnetic layer.

8. The magnetic head according to claim 7, wherein said first magnetic layer is formed on a buffer layer.

9. The magnetic head according to claim 8, wherein a junction plane between the first magnetic layer and the tunnel barrier layer is constituted by (211) plane of the first magnetic layer, the buffer layer is constituted by a layer having A-plane of cobalt or a cobalt-chromium alloy each having an hcp structure, (211) plane of chromium having a bcc structure, (110) plane of gold having a fcc structure, (110) plane of magnesium oxide, (11-20) plane of sapphire or (001) plane of a titanium-chromium alloy having a bcc structure; or constituted by a multi-layer structure formed of a combination of two or more layers having two or more said planes.

10. The magnetic head according to claim 8, wherein the first magnetic layer is formed of a single crystal, and the junction plane between the first magnetic layer and the tunnel barrier layer is constituted by (110) plane, the buffer layer is constituted by a layer having (110) plane of molybdenum having a bcc structure, (110) plane of tungsten having a bcc structure, (110) plane of tantalum having a bcc structure or (110) plane of chromium having a bcc structure; or constituted by a multi-layer structure formed of a combination of two or more layers having two or more said planes.

11. The magnetic head according to claim 8, wherein the first magnetic layer is formed of polycrystal, and the junction plane between the first magnetic layer and the tunnel barrier layer is constituted by (110) plane, the buffer layer is constituted by a layer having (111) plane of a metal having a fcc structure or (0001) plane of a metal having an hcp structure; or constituted by a multi-layer structure formed of a combination of two or more layers having two or more said planes.

12. The magnetic head according to claim 7, wherein the junction plane between the first magnetic layer and the tunnel barrier layer is constituted by a crystal face having an inclined angle of not more than 10 degrees as measured from the (211) or (110) plane of the first magnetic layer.

13. A magnetic memory comprising a plurality of tunneling magnetoresistive elements which are arrayed in a matrix pattern, means for selectively applying a magnetic field onto each tunneling magnetoresistive element, and means for selectively detecting the resistance of each tunneling magnetoresistive element; and which is characterized in that each of said tunneling magnetoresistive element is formed of the tunneling magnetoresistive element claimed in claim 1.

14. The tunneling magnetoresistive element according to claim 1, wherein said junction plane is constituted by the (211) plane of said first magnetic layer.

15. The tunneling magnetoresistive element according to claim 1, wherein at least opposite surfaces of said first magnetic layer are substantially flat.

16. The magnetic head according to claim 7, wherein said junction plane is constituted by the (211) plane of said first magnetic layer.

17. The magnetic head according to claim 7, wherein at least opposite surfaces of said first magnetic layer are substantially flat.

* * * * *